United States Patent [19]

Papenhagen et al.

[11] Patent Number: 5,161,657
[45] Date of Patent: Nov. 10, 1992

[54] ARRANGEMENT ON A BRAKE PEDAL FOR THE LOCKING AND RELEASE OF A SHIFT DEVICE OF A CHANGE GEAR OF A MOTOR VEHICLE

[75] Inventors: Dieter Papenhagen, Waiblingen; Franz Kosik, Ostfildern; Martin Müller, Esslingen, all of Fed. Rep. of Germany

[73] Assignee: Mercedes-Benz AG, Fed. Rep. of Germany

[21] Appl. No.: 717,499

[22] Filed: Jun. 19, 1991

[30] Foreign Application Priority Data

Jul. 27, 1990 [DE] Fed. Rep. of Germany ....... 4023876

[51] Int. Cl.$^5$ .............................................. B60K 41/26
[52] U.S. Cl. ..................................... 192/4 A; 74/474; 74/475; 74/532
[58] Field of Search ............. 192/4 A, 114 R; 74/474, 74/475, 478, 532

[56] References Cited

U.S. PATENT DOCUMENTS

| 2,908,785 | 10/1959 | Koskela | 74/534 |
| 4,421,214 | 12/1983 | Sellmeyer | 192/4 A |
| 4,572,340 | 2/1986 | Pierce | 192/4 A |

FOREIGN PATENT DOCUMENTS 3842333  4/1990  Fed. Rep. of Germany.

Primary Examiner—Leslie A. Braun
Assistant Examiner—Andrea Pitts
Attorney, Agent, or Firm—Evenson, Wands, Edwards, Lenahan & McKeown

[57] ABSTRACT

A cam control between a brake pedal and an adjusting lever for actuating a locking device for a selector lever of an automatically shifting change gear is so designed that the moments resulting on the brake pedal from the actuation of the locking device are approximately zero in a narrow pivot-angle range of the brake pedal which contains the position of rest.

8 Claims, 3 Drawing Sheets

ARRANGEMENT ON A BRAKE PEDAL FOR THE LOCKING AND RELEASE OF A SHIFT DEVICE OF A CHANGE GEAR OF A MOTOR VEHICLE

BACKGROUND AND SUMMARY OF THE INVENTION

The present invention relates to an arrangement on a brake pedal, used for actuating the operating brakes of a motor vehicle, for releasing a lever of a shift device of a change gear. The arrangement has a first actuating member fixedly arranged in terms of movement on the pivotably mounted brake pedal and a second actuating member fixedly arranged in terms of movement on an adjusting lever mounted in the vicinity of the brake pedal. The members lock and release a locking device assigned to the lever of the shift device. A locking spring is anchored or supported on a part fixed to the vehicle and engages or is effective on the adjusting lever in one pivoting direction with the effect of a locking and an associated actuating member engages or is effective on the adjusting lever in the opposite pivoting direction with the effect of a release.

In a known arrangement of this type (U.S. Pat. No. 4,572,340), via a hydrostatic linkage connected to the hydraulics the brake pedal acts, together with the locking spring, on one lever arm of the two-armed adjusting lever. The other lever arm of the lever has corresponding recesses for the respective locking of the three positions of a bolt which is arranged rigidly on a shift lever of a shift device of a gear shiftable into a neutral position and into a further position for forward and reverse travel, so that this locking device has to be released by the brake pedal for every gear shift. The constant hydraulic coupling of the adjusting lever to the brake pedal gives rise to a disturbing influence brought about by the locking spring when relatively low finely proportioned brake forces are to be exerted.

An object of the present invention is to provide an arrangement for locking and release of a lever of a shift device, that avoids hydraulic means for locking the lever of the shift device, especially the manual selector lever of an automatic shift device, for safety reasons and to minimize or prevent undesirable influences of the locking spring during the exertion of low brake forces.

This and other objects are achieved by the present invention which provides an arrangement on a pivotably mounted brake pedal having a pivot axis and used for actuating the operating brakes of a motor vehicle, for releasing a lever of a shift device of a change gear. The arrangement comprises an adjusting lever mounted in the vicinity of the brake pedal, a locking device assigned to the lever of the shift device, a first actuating member fixedly arranged fixedly on the brake pedal, and a second actuating member arranged fixedly on the adjusting lever. The first and second actuating members lock and release the locking device assigned to the lever of the shift device. A locking spring is coupled on a part fixed to the vehicle and is operable on the adjusting lever in a first pivoting direction with the effect of a locking. One of the first or second actuating members is operable on the adjusting lever in a second, opposite pivoting direction to effect a release. The first and second actuating members are cams and are directly engageable with one another, with at least one of the first and second actuating limited pivotable range of the brake pedal including a position of rest, forces resulting on the first actuating member are at least approximately in a plane containing the pivot axis of the brake pedal.

The arrangement according to the present invention is especially suitable for those locking devices in which the lever of the shift device can be blocked in only one position, that is concerned. In the other positions a cam control of the locking device is effective on the adjusting lever, and keeps the locking spring per se under tension. The influence on the brake pedal invention, even in the narrow pivot-angle range under consideration. When the invention is used for arrangements of this type, for example according to U.S. Pat. No. 5,014,831 herein incorporated by reference, the spring coordination between the three springs employed is then carried out according to certain preferred embodiments of the present invention. For example, in one embodiment, there is a return spring coupled to the brake pedal, this return spring actuating the brake pedal in the direction of its position of rest, and the locking spring has lower spring forces than the return spring In addition, in certain embodiments, the locking device has a release spring that effects a release of the locking device, the locking spring has higher spring forces than the release spring, and the engagement surface is further shaped to cause the first and second actuating members to disengage when the brake pedal assumes its position of rest and the locking device is released.

The arrangement according to the invention is kept play-free in an advantageous way in certain embodiments by providing that the engagement surface is further shaped so that, in a limited pivot-angle range of the brake pedal adjacent to a pedal position of the brake pedal which corresponds to a released state of the locking device, the first and second actuating members are maintained in further mutual engagement, with the lever moments resulting on the brake pedal being kept low.

Other objects, advantages and novel features of the present invention will become apparent from the following detailed description of the invention when considered in conjunction with the accompanying drawings.

DETAILED DESCRIPTION OF THE DRAWINGS

Figure 1:
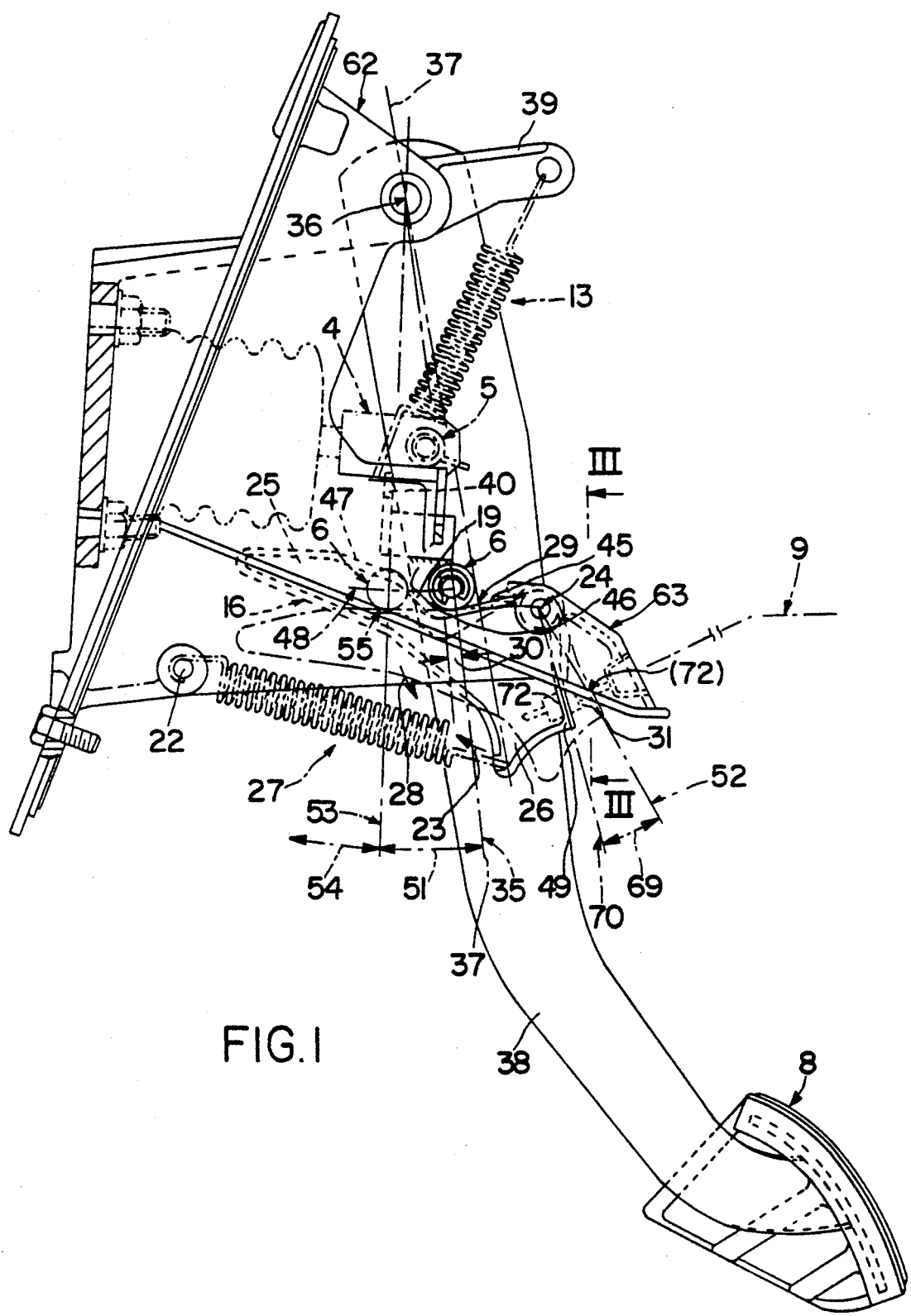
FIG. 1 shows a diagrammatic representation of a brake pedal of a motor vehicle with an arrangement according to an embodiment of the present invention for releasing and locking a selector lever of an automatic shift device of a change gear.
Figure 2:
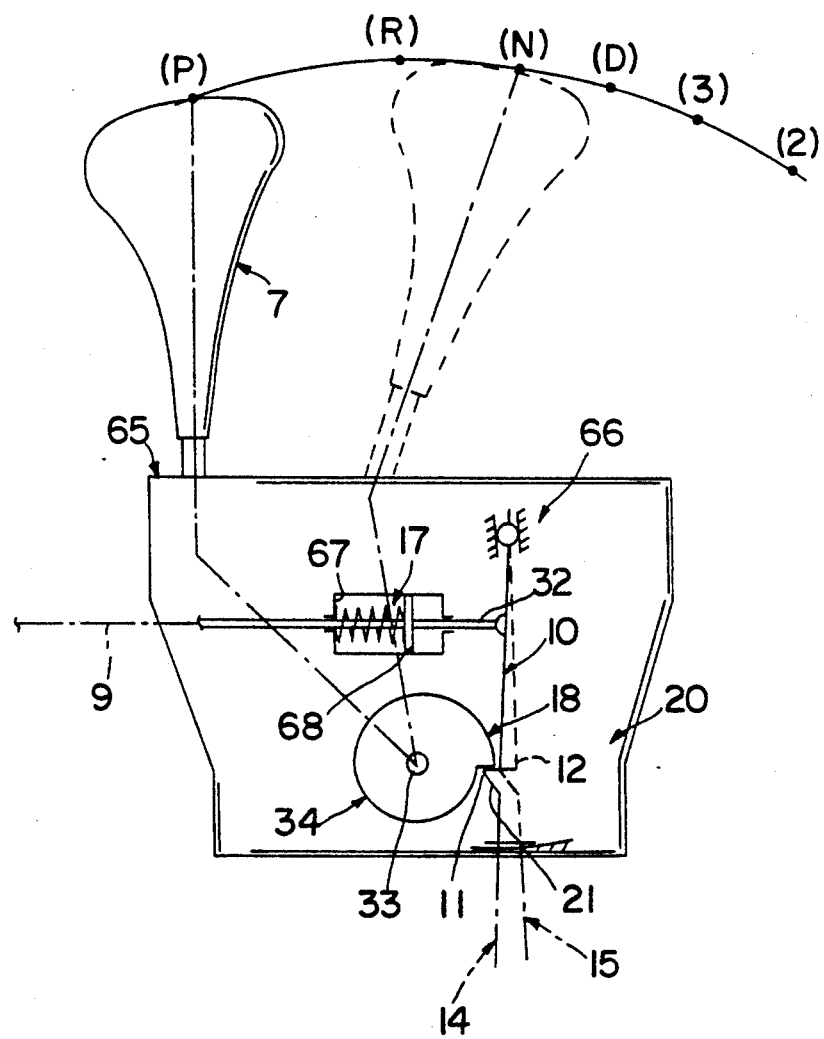
FIG. 2 shows a diagrammatic representation of a locking device of the prior art actuatable by means of the arrangement according to the present invention of FIG. 1.

On a bracket 62 conventionally installed fixedly in terms of movement in a motor vehicle in the foot space in front of the driver's seat, a brake pedal 8 is mounted by means of its pedal lever 38 so as to be pivotable about a geometrical pivot axis 36—36. A return spring 13 in the form of a cylindrical helical spring subjected to tension is suspended respectively in the lugs of a fastening plate 39 of the bracket 62 and the lugs of a fastening plate 40 of the pedal lever 38. The return spring 13 actuates the brake pedal 8 in the direction of its illustrated position of rest 35.

In the region located between its pivot axis 36—36 and its fastening plate 40, the pedal lever 38 is connected by means of a single-axis joint 5 to the conventional brake linkage 4 which motor vehicle and which is therefore actuated when the brake pedal 8 is depressed.

Figure 3:
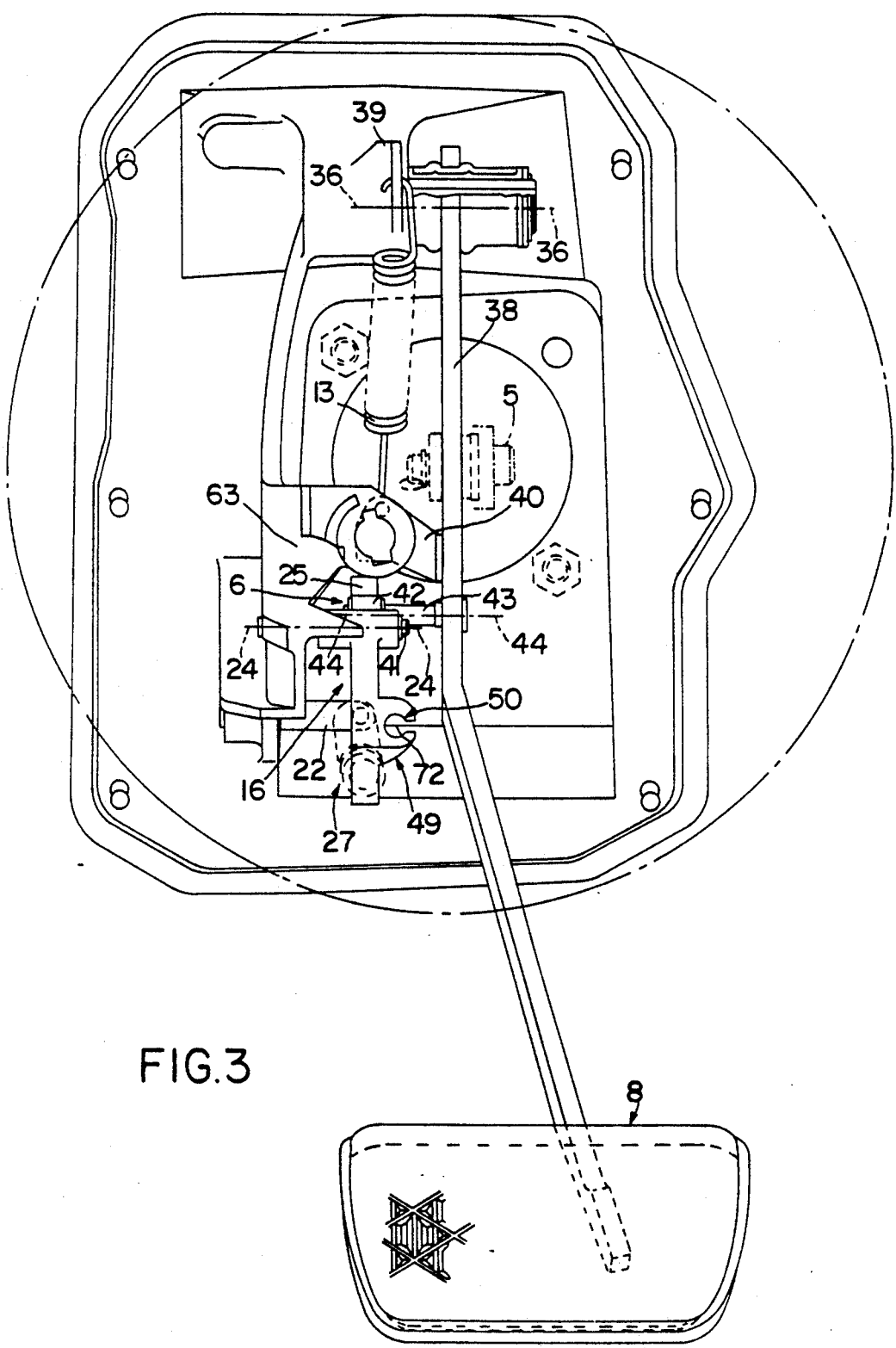
FIG. 3 shows a section through the arrangement of FIG. 1 along the line III—III.

As seen in FIG. 3, on a bracket part 63 of the bearing bracket 62 located in the vicinity of the pedal lever 38, there is fixedly mounted, coaxially with a pivot axis 24—24 parallel to the pivot axis 36—36 of the brake pedal 8, a bearing bolt 41. A two-armed adjusting lever 16 for actuating a locking device 20 provided on a manual selector lever 7 of an automatic shift device of a change gear is mounted pivotably on the bearing bolt 41. Provided on one lever arm 25 of the adjusting lever 16 is an actuating member 19 in the form of a cam with an engagement surface 29 which interacts directly with an actuating member 6 on the pedal lever 38 in a way explained further below. The actuating member 6 has a rolling cam 42 which can be brought to bear directly on the engagement surface 29 and which is mounted rotatably on a bearing journal 43 retained fixedly on the pedal lever 38 with its axis 44—44 parallel to the pivot axes 24—24 and 36—36. The engagement surface 29 comprises a radially inner portion 45 located nearer the pivot axis 24—24, an adjoining middle portion 46 and an adjoining radially outer portion 47.

When the brake pedal 8 is depressed out of the position of rest 35, after the brake pedal 8 has covered a limited small pivot-angle range 30, the rolling cam 42 comes into engagement with the middle portion 46 of the engagement surface 29 extending transversely relative to the circular path 48 of the rolling cam 42, so that the adjusting lever 16 is actuated in the pivoting direction 28 acting with the effect of a release of the locking device 20.

A locking spring 27 subjected to tension and in the form of a cylindrical helical spring is suspended at one spring end on a stay bolt 22 retained fixedly on the bearing bracket 62. The other spring end of the locking spring 27 is suspended in a lug of the other lever arm 26 of the adjusting lever 16, the stay bolt 22 and the lug of the lever arm 26 being so oriented relative to the pivot axis 24—24 that the locking spring 27 actuates the adjusting lever 16 in the other pivoting direction 23 acting to effect a locking of the locking device 20.

In the region located between the lug for the locking spring 27 and the pivot axis 24—24, the lever arm 26 of the adjusting lever 16 is produced in one piece with a fastening plate 49 of which one linkage end 31 of an adjusting linkage 9 in the form of a cable pull is articulated on the lever arm 26, the point of articulation bearing the reference numeral 72.

The adjusting linkage 9 leading to the locking device 20 is articulated at its other linkage end 32 on a detent element 10 which is arranged near the pivot axis 33 of the manual selector lever 7 pivotably between a locking position 14 and a free position 15 by means of a joint 66. The manual selector lever 7 is arranged in the manner of a middle gear shift on the transmission tunnel 65 of the motor vehicle laterally of the driver's seat and is fixedly connected to a cam-disc part 34 rotatable about the pivot axis 33. In the (P) position of the manual selector lever 7, when the brake pedal 8 is in its position of rest 35, a blocking cam 11 of the cam-disc part 34 and a counter-blocking cam 12 of the detent element 10 are in engagement with one another in such a way that an actuation of the manual selector lever 7 into one of the other positions (R), (N), (D), (3), or (2) is blocked, hence the lever 7 is locked (locking position 14 of the detent element 10). At the same time, a release spring 17 arranged in the vicinity of the detent element 10 is compressed between a spring stop fixedly arranged on the linkage end 32 and in the form of a collar 68 and a spring abutment 67 fixed to the vehicle. The release spring 17 is maintained under prestress.

A release of the manual selector lever 7 is obtained by depressing the brake pedal 8 through a differential angle 51, the rolling cam 6 rolling on the middle portion 46 of the engagement surface 29. The adjusting lever 16 pivots until the outer portion 47 of the engagement surface 29 is reached in the pedal position 53, and thereby actuates the adjusting lever 16 through a differential angle 69, so that the point of articulation 72 of the adjusting linkage 9 has travelled out of its illustrated locking position 70 into the location, indicated at (72), of a release position 52. This makes it possible for the release spring 17 to actuate the detent element 10 into its free position 15 and thereby release the manual selector lever 7.

When the manual selector lever 7 thus released is actuated out of the (P) position into one of the selection-range positions (R), (N), (D), (3) or (2), a control cam surface 18 of the camdisc part 34 and a counter-control cam surface 21 on the detent element 10 come into engagement in such a way that the detent element 10 remains actuated into its free position 15. In this way, the coupled adjusting linkage 9 keeps the adjusting lever 16 in the release position 52, in which the actuating elements 6 and 19 have lifted off from one another, i.e., out of engagement. The forces resulting from the actuation of the 21 therefore have no influence on the brake pedal 8 and return spring 13.

In the position of rest 35 and in the adjacent pivot-angle range 30 of the brake pedal 8, the forces exerted on the rolling cam 6 by the adjusting lever 16 are kept low in terms of their effect on the return spring 13 by making the corresponding lever moments about the pivot axis 36—36 approach zero. In other words, the portion 45 of the engagement surface 29 extends approximately tangentially relative to the circular path 55 of the point of engagement on the rolling cam 6 about the pivot axis 36—36, the forces then acting approximately in a plane 37—37 containing the pivot axis 36—36.

The trend of the outer portion 47 of the engagement surface 29 relative to the circular path 55 is kept similar, but with a somewhat more pronounced deviation from the tangential, so that the engagement members 6 and 19, while keeping the resultant forces low, still reliably remain mutually engaged when the brake pedal 8 is depressed beyond the pedal position 53.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Arrangement on a pivotably mounted brake pedal having a pivot axis and used for actuating the operating brakes of a motor vehicle, for releasing a lever of a shift device of a change gear, the arrangement comprising:
   an adjusting lever;

a locking device attached to the lever of the shift device;

a first actuating member arranged fixedly on the brake pedal;

a second actuating member arranged on the adjusting lever, said first and second actuating members locking and releasing the locking device attached to the lever of the shift device;

a locking spring coupled to a fixed part coupled to the vehicle operable on the adjusting lever in a first pivoting direction with the effect of locking and one of said first and second actuating members is operable on the adjusting lever in a second, opposite pivoting direction to effect a release;

wherein the first and second actuating members are cam and are directly engageable with one another, with at least one of said first and second actuating members having an engagement surface shaped such that, in a limited pivotable range of the brake pedal including a position of rest, resultant forces on the first actuating member are at least approximately in a plane containing the pivot axis of the brake pedal.

2. The arrangement according to claim 1, further comprising a return spring coupled to the brake pedal that actuates the brake pedal in a direction of its position of rest, wherein the locking spring has lower spring forces than the return spring.

3. The arrangement according to claim 2, wherein the locking device has a release spring that effects a release of the locking device, and wherein the locking spring has higher spring forces than the release spring, and the engagement surface is further shaped to cause the first and second actuating members to disengage when the brake pedal assumes its position of rest and the locking device is released.

4. The arrangement according to claim 3, wherein the engagement surface is further shaped so that, in a limited pivot-angle range of the brake pedal adjacent to a pedal position of the brake pedal which corresponds to a released state of the locking device, the first and second actuating members are maintained in further mutual engagement, with lever moments resulting on the brake pedal being kept low.

5. The arrangement according to claim 1, wherein the locking device has a release spring that effects a release of the locking device, and wherein the locking spring has higher spring forces than the release spring, and the engagement surface is further shaped to cause the first and second actuating members to disengage when the brake pedal assumes its position of rest and the locking device is released.

6. The arrangement according to claim 5, wherein the engagement surface is further shaped so that, in a limited pivot-angle range of the brake pedal adjacent to a pedal position of the brake pedal which corresponds to a released state of the locking device, the first and second actuating members are maintained in further mutual engagement, with lever moments resulting on the brake pedal being kept low.

7. The arrangement according to claim 2, wherein the engagement surface is further shaped so that, in a limited pivot-angle range of the brake pedal adjacent to a pedal position of the brake pedal which corresponds to a released state of the locking device, the first and second actuating members are maintained in further mutual engagement, with lever moments resulting on the brake pedal being kept low.

8. The arrangement according to claim 1, wherein the engagement surface is further shaped so that, in a limited pivot-angle range of the brake pedal adjacent to a pedal position of the brake pedal which corresponds to a released state of the locking device, the first and second actuating members are maintained in further mutual engagement, with lever moments resulting on the brake pedal being kept low.

* * * * *